United States Patent [19]
Webb

[11] Patent Number: 5,975,371
[45] Date of Patent: Nov. 2, 1999

[54] MODULAR ABOVEGROUND SERVICE STATION AND METHOD OF ASSEMBLY

[76] Inventor: R. Michael Webb, 3108 Sherman Ave., Eau Claire, Wis. 54701

[21] Appl. No.: 09/102,298

[22] Filed: Jun. 22, 1998

[51] Int. Cl.$^6$ ...................................................... B67D 5/64
[52] U.S. Cl. ........................... 222/173; 137/376; 137/581
[58] Field of Search ...................................... 222/108, 173, 222/608, 129; 137/234.6, 581, 376; 220/567.2

[56] References Cited

U.S. PATENT DOCUMENTS

| | | | |
|---|---|---|---|
| 2,273,601 | 2/1942 | Thomas | 220/567 |
| 3,505,769 | 4/1970 | Miron et al. | 52/249 |
| 4,901,748 | 2/1990 | Shotmeyer | 137/234.6 |
| 4,988,020 | 1/1991 | Webb | 222/608 |
| 5,033,637 | 7/1991 | Webb | 220/565 |
| 5,114,046 | 5/1992 | Bryant | 222/108 |
| 5,299,709 | 4/1994 | Beerbower et al. | 137/376 |
| 5,305,926 | 4/1994 | Webb | 222/183 |
| 5,400,924 | 3/1995 | Brodie | 222/108 |
| 5,526,964 | 6/1996 | Moore et al. | 137/234.6 |
| 5,562,162 | 10/1996 | Webb | 169/45 |
| 5,586,586 | 12/1996 | Fiech | 137/234.6 |
| 5,603,134 | 2/1997 | Whipkey et al. | 52/223.7 |
| 5,628,431 | 5/1997 | Roach et al. | 222/145.5 |

*Primary Examiner*—Kevin P. Shaver
*Assistant Examiner*—Jorge Bocanegra
*Attorney, Agent, or Firm*—Knoble & Yoshida LLC

[57] ABSTRACT

A modular, portable, environmentally friendly aboveground fueling assembly includes at least one pad member that is supported on the ground, and that is fabricated from a material that is heat resistant and that is resistant to exposure to petroleum products. A portable aboveground fuel tank is supported on the pad member, and at least one pumping station is included for dispensing fuel from the tank to a customer. A freestanding structure is secured to the fuel tank and the pad, and the structure is designed to give an aesthetic effect of a more substantial, permanent facility than would be given by the aboveground fuel tank standing alone. The components of the assembly are generally designed so as to be conveniently portable and so as to be simple to assemble and disassemble in the field. The assembly serves a need for inexpensive and environmentally friendly service stations, particularly in rural areas and underdeveloped countries.

26 Claims, 7 Drawing Sheets

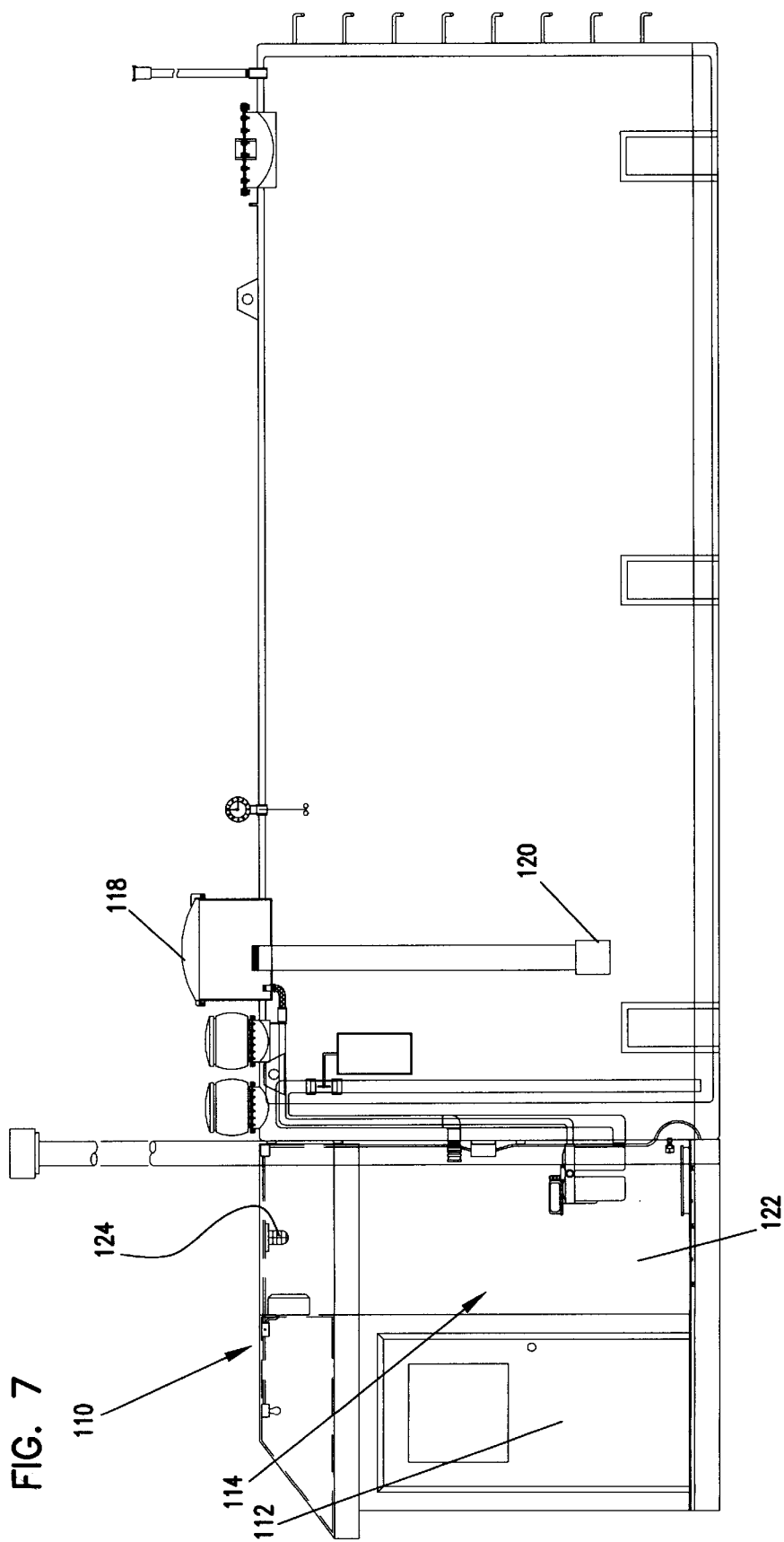

MODULAR ABOVEGROUND SERVICE STATION AND METHOD OF ASSEMBLY

BACKGROUND OF THE INVENTION

1. Field of the Invention

The present invention relates to a portable service station that can be conveniently and efficiently deployed at an airport or a vehicle service area, and that is environmentally friendly, aesthetically attractive and particularly suited for installation in parking lots of supermarkets and shopping centers, as well as rural and underdeveloped areas.

2. Description of the Related Technology

One significant disadvantage of in-ground refueling stations such as most existing vehicular service stations is the time and labor involved in preparing and constructing such a facility. Some factors that contribute to the expense of constructing a belowground facility include the need for construction permits, subcontractors, excavation and the time and planning involved in locating a permanent site for the facility. Once installed, such facilities cannot practically be moved to different locations, or be sold.

Fueling facilities that use aboveground tanks have become more common in recent years, in no small part because of the efforts of the inventor, R. Michael Webb, and the company he founded, U-Fuel, Inc. of Eau Claire Wisconsin. Aboveground fueling facilities that have been designed by Mr. Webb and marketed by U-Fuel, Inc. are disclosed in U.S. Pat. Nos. 4,988,020; 5,033,637; 5,305,926; and 5,562,162, the disclosures of which are hereby incorporated as if set forth fully herein.

Aboveground fueling facilities have a number of advantages, some of which are set forth above. However, traditional above ground tanks are sometimes not aesthetically suitable for the purpose of service stations in developed areas, such as residential neighborhoods or in automotive service areas that are near busy highways. It is also necessary to lay large concrete pads to support the weight of the tank and to direct fluids such as rain water away from the tank so as to avoid contamination, especially in areas that have strict environmental regulations. Such pads must be constructed on site, because of their great size and weight. This prevents a contractor from prefabricating an entire aboveground service station and moving it on site, which would otherwise be economically desirable, especially when deploying a system in an underdeveloped or rural area that is remote from the facilities of the contractor.

It is clear that a need exists for improved aboveground service station facility that is conveniently portable, that does not require the same degree of on site preparation as conventional above ground facilities, and that is aesthetically proper for use in developed areas such as residential neighborhoods or in automotive service areas by a busy highway.

SUMMARY OF THE INVENTION

Accordingly, it is an object of the invention to provide an improved aboveground service station facility that is conveniently portable, that does not require the same degree of on site preparation as conventional above ground facilities, and that is aesthetically proper for use in developed areas such as residential neighborhoods or in automotive service areas by a busy highway.

In order to achieve the above and other objects of the invention, a portable aboveground fluid containment assembly includes an elongated aboveground tank having a longitudinal axis; at least two pads for supporting the tank with respect to an underlying surface, each of the pads extending lengthwise in a direction that is substantially parallel to the longitudinal axis; and wherein the aboveground tank comprises at least one support member for supporting the tank on the pads, the support member being constructed and positioned so as to overlie both of the pads, thereby stabilizing the pads with respect to each other and stabilizing the entire portable aboveground fluid containment assembly.

According to a second aspect of the invention, a method of installing an aboveground fluid containment assembly includes steps of: (a) positioning at least two pads onto the ground, the pads being juxtaposed with respect to each other so as to define a longitudinal seam therebetween; and (b) deploying a portable aboveground fluid containment tank onto the pads so as to overlay both of the pads, whereby the pads are stabilized with respect to each other and to the entire portable aboveground fluid containment assembly.

According to a third aspect of the invention, a modular, portable, environmentally friendly aboveground fueling assembly includes at least one pad member that is supported on the ground, the pad member being fabricated from a material that is heat resistant and that is resistant to exposure to petroleum products; a portable aboveground fuel tank supported on the pad member; pump means for dispensing fuel from the tank to a customer; and a freestanding structure secured to the fuel tank and the pad, said structure giving an aesthetic effect of a more substantial, permanent facility than would be given by said aboveground fuel tank standing alone.

A modular, portable, environmentally friendly aboveground fueling assembly according to a fourth aspect of the invention includes a portable aboveground fuel tank; a pump for dispensing fuel from the tank to a customer; and an attendant module secured to the fuel tank, the attendant module being constructed and arranged from a fire-resistant material, whereby the operator and other occupants of said module are protected in the event of a fire-related emergency.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 7 is a side elevational view of a station that is constructed according to a second preferred embodiment of the invention.

DETAILED DESCRIPTION OF THE PREFERRED EMBODIMENT(S)

Figure 1:
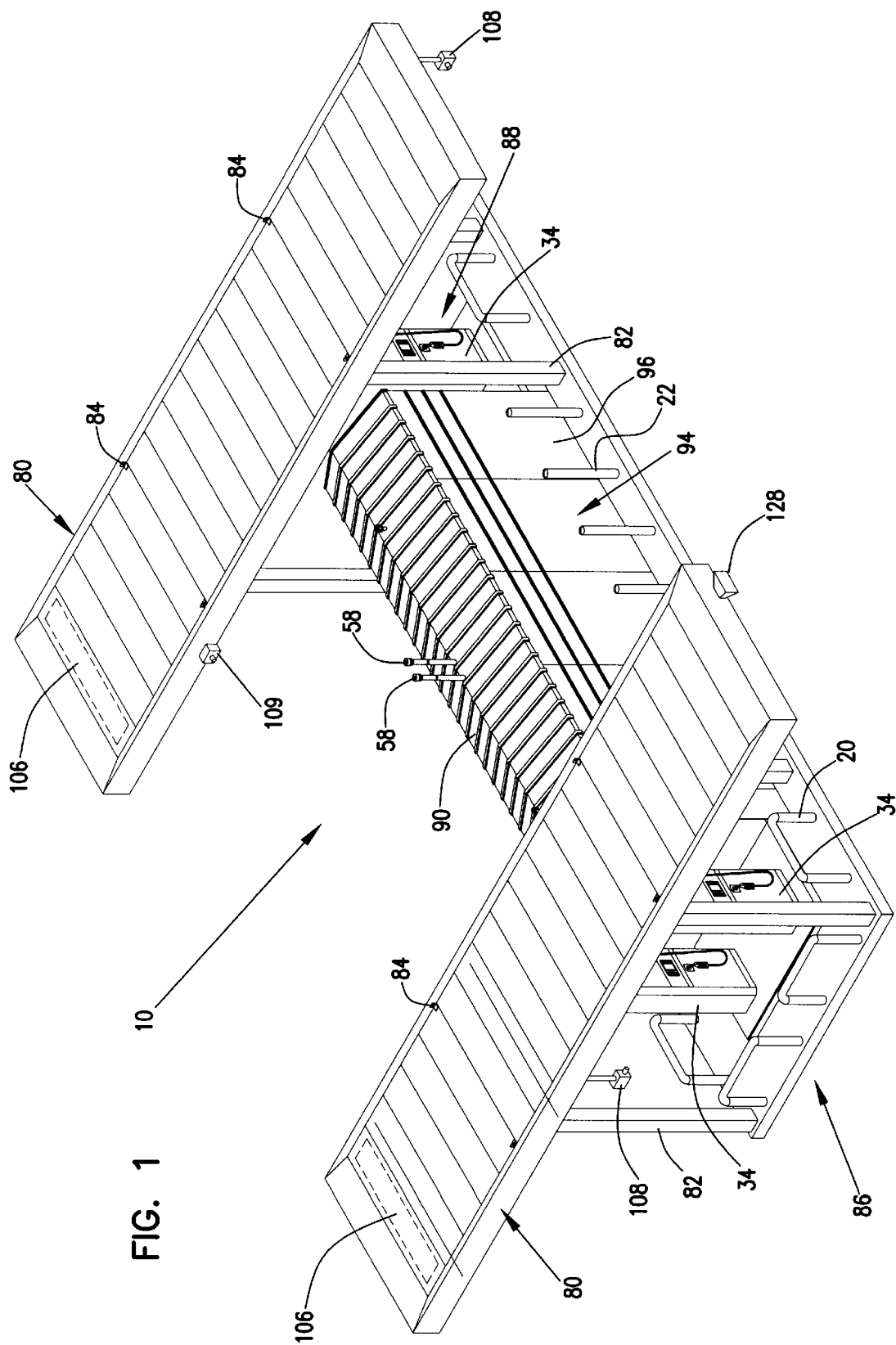
FIG. 1 is a perspective view of a modular service station that is constructed according to a preferred embodiment of the invention.
Figure 2:
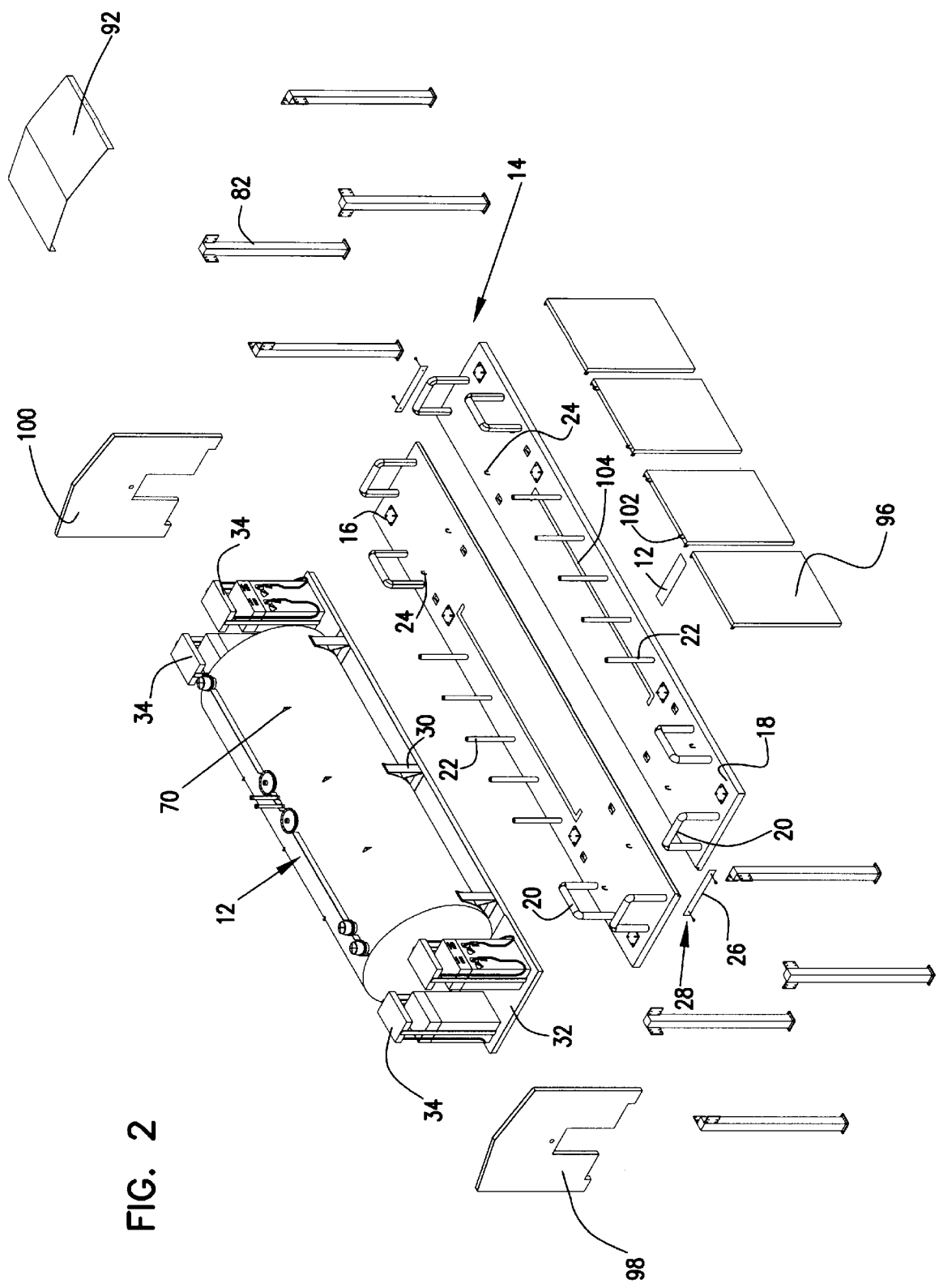
FIG. 2 is an exploded assembly drawing showing the service station that is depicted in FIG. 1.

Referring now to the drawings, wherein like reference numerals designate corresponding structure throughout the views, and referring in particular to FIG. 1, a portable above-ground fluid containment assembly that is embodied as a modular service station 10 includes an elongated above-ground tank 12 that has a longitudinal axis, which is evident from the orientation of the tank 12 that is shown in FIGS. 1 and 2. Station 10 further includes an interlocking concrete pad assembly 14 that preferably includes at least a first slab-like weight distributing pad 16 and a second slab-like weight distributing pad 18, as may best be seen in FIG. 2. Although the pads 16, 18 are preferably fabricated from concrete, they could alternatively be fabricated from any other material that is heat resistant and that is resistant to the types of petroleum products that pads 16, 18 are likely to come in contact with, such materials including steel, aluminum, polyurethane and other chemical and heat resistant plastics.

As may be seen in FIGS. 1 and 2, each of the pads 16, 18 includes a plurality of ballards 20, 22, one type of which is a ballard 20 that is of an inverted U-shape, and another which is a ballard 22 that has the shape of a vertically-oriented pole. The purpose of the ballards 20, 22 is to protect the above-ground tank 12 against collision, such as with a vehicle that is being refueled. Ballards 20, 22 are preferably integral with the pads 16, 18, and are preferably connected together within the concrete material by additional structural reinforcements, details of which are well-known in the construction industry in general.

As may further be seen in FIG. 2, each of the pads 16, 18 is provided with a number of lifting lugs 24, which are preferably recessed into the pad so as to not interfere with the placement of tank 12 upon the pad. The purpose of the lugs 24 is to permit the pads 16, 18 to conveniently be deployed by the use of a construction crane or similar device. The modular nature of the pads 16, 18 in conjunction with the provision of the lugs 24 permit the interlocking pad assembly 14 to be prefabricated at the contractor's facility, then moved by truck to the intended site of deployment. This avoids the need to do lengthy construction work on-site.

Once deployed in place, the pads 16, 18 are secured together at their edges by means of a pair of steel securement plates 26 which are secured at each end to one of the pads 16, 18 by means of an anchor 28. This secures the pads 16, 18 against shifting with respect to each other, while retaining some fluxual adaptability on the seam that is formed longitudinally between the two pads 16, 18. As may be seen, no inground footings are necessary.

As may be seen in FIG. 2, above ground fuel storage tank 12 includes a base 32 and a plurality of saddles 30 for supporting the substantially cylindrical tank 12 on the base 32 and the interlocking concrete pad assembly 14. The saddles 30 and the base 32 are thus constructed and positioned so as to overlay both of the pads 16, 18, which stabilizes the pads with respect to each other and also stabilizes the entire portable above ground fuel containment assembly.

Station 10 includes at least one pumping station 34, and, in the depicted embodiment, there are four such pumping stations 34. The precise construction of the storage tank 12 and the pumping stations 34 may be as described in any of the U.S. patents listed above and incorporated herein by reference. As is conventional in such systems, however, storage tank 12 preferably includes a first tank compartment 54, which may be for storing a first grade of gasoline, and a second tank compartment 56, which could be used for storing a second grade of gasoline. The compartments 54, 56 may best be seen in FIG. 3. As is further shown in FIG. 3, station 10 preferably includes a pair of deck compartments 38 through which supply pipes 36 for the pump assemblies 34 extend for purposes of secondary containment, a pair of stage I vapor recovery lines 40, a pair of fill pipes 42 for filling the tank compartments 54, 56 with product, respectively, and an openable, detachable compartment 44 for providing security and secondary containment about the fill pipes 42. Station 10 further includes an overfill shut-off system 46, and an ignition suppression system 48in each of the tank compartments 54, 56. The exact construction of the ignition suppression system 48is disclosed in U.S. Pat. No. 5,562,162 to Webb, the disclosure of which is hereby incorporated into this document as if fully set forth herein. A number of lifting lugs 50 are provided on the above ground tank 12 for convenient deployment of the tank 12 by means of a crane or similar apparatus. Each of the tank compartments 54, 56 is provided with a working vent 52 for normal venting of the compartment 54, 56 during operation, and an emergency vent 62 that is designed to permit vapor to burn off harmlessly in the event of a fire-related emergency. Each tank compartment 54, 56 is further fitted with a gauge 60 that is designed to sense and report the level of product within the respective tank compartment 54, 56. A manway 64 is further provided to provide access to the interstitial space between the outer tank and the inner tanks that define the first and second tank compartments 54, 56 and to provide access to the compartments 54, 56.

Figure 3:
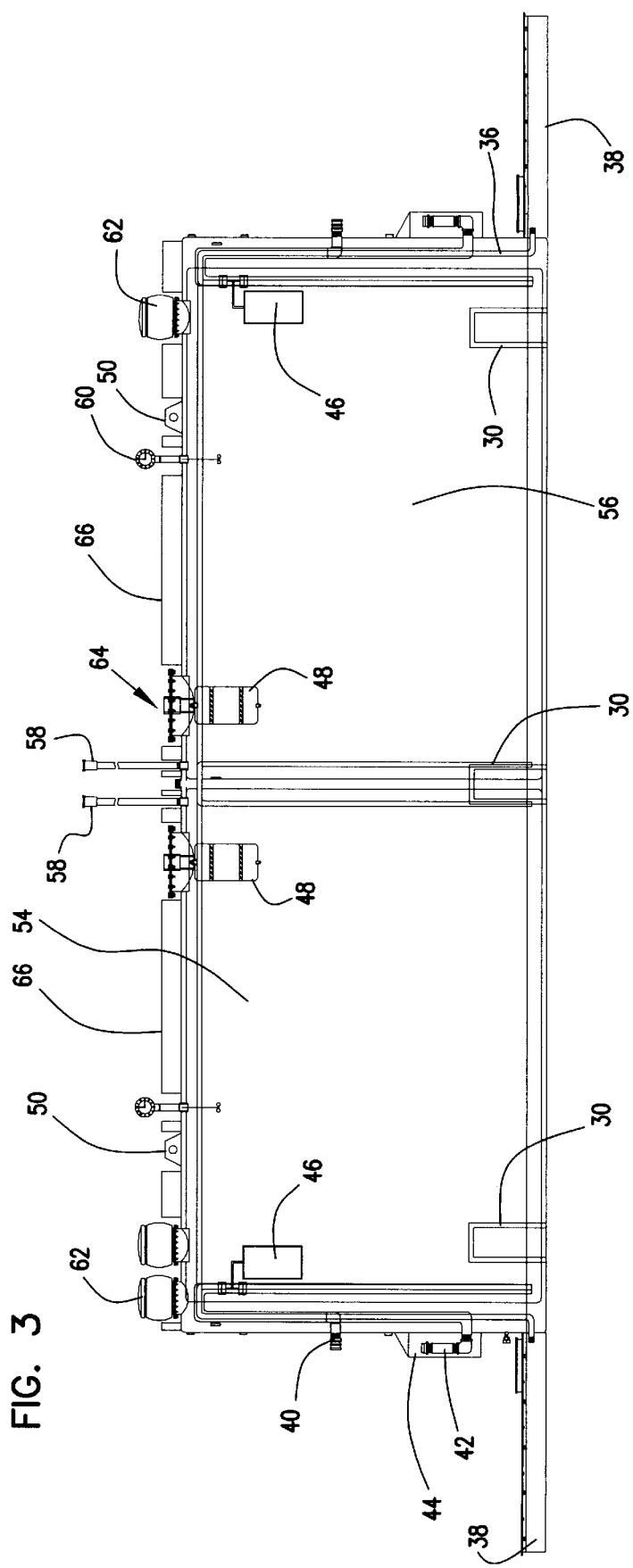
FIG. 3 is a side elevational view of the station that is illustrated in FIGS. 1 and 2.
Figure 4:
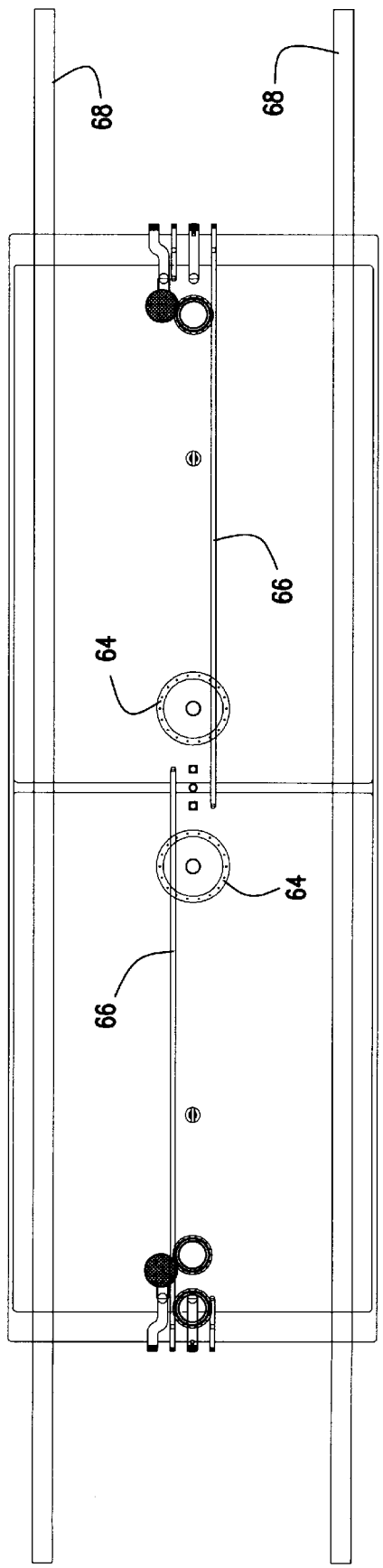
FIG. 4 is a top plan view of a portion of the system that is shown in FIGS. 1–3.

As is best shown in FIGS. 2 and 3, the above ground tank 12 is provided with a pair of roof support stand-off members 66, which are secured to the top of the tank 12 by welding and are sized to provide spacing between the tank 12 and a roof 90 of an enclosure 94 that is built about the tank 12 as will be described in greater detail below. Fittings 70 are secured to the tank 12 for attaching side panels 96 of the enclosure 94, as will also be described in greater detail below.

Figure 6:
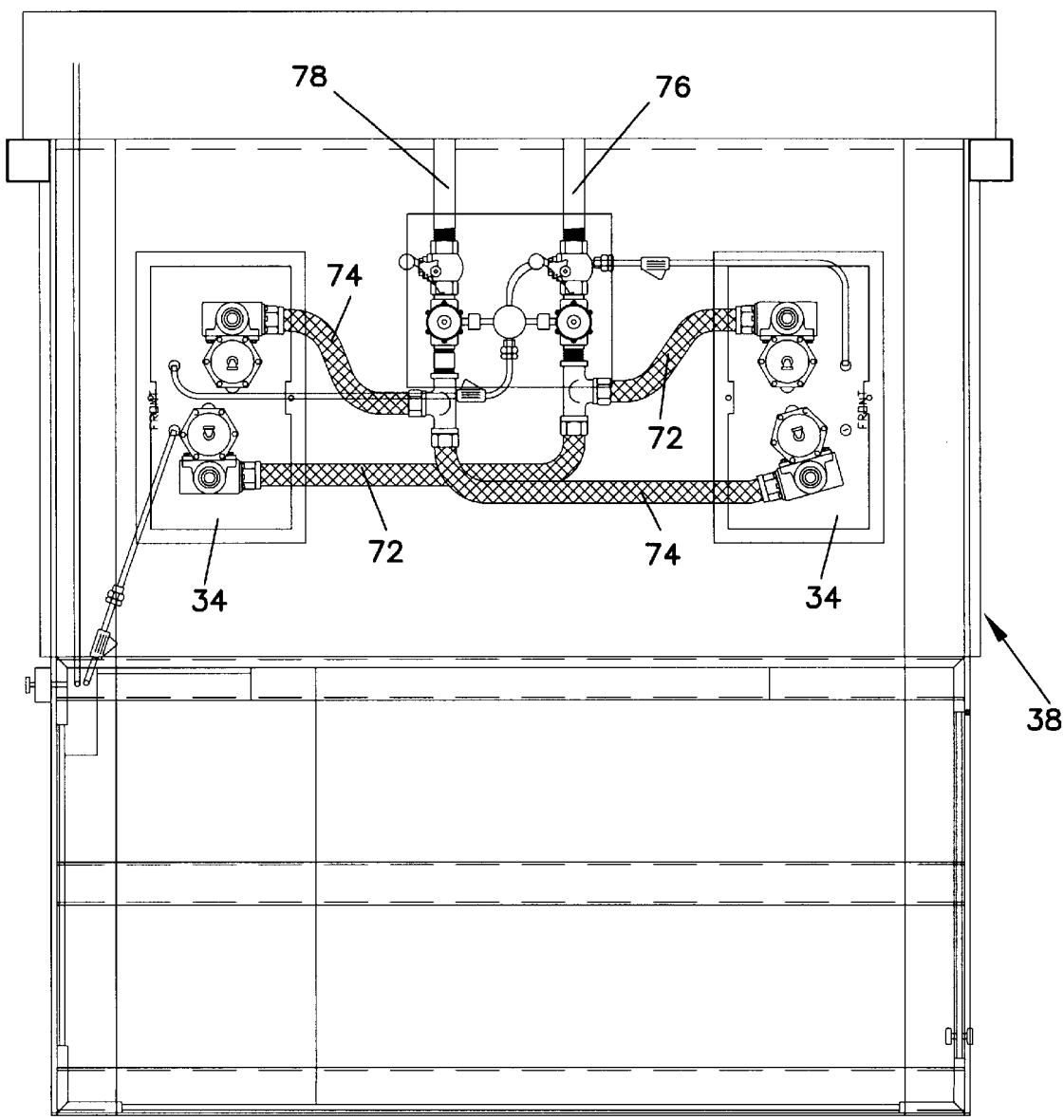
FIG. 6 is a top plan view, shown in cut-away, of a portion of the system shown in FIGS. 1–5.

Referring now briefly to FIG. 6, which is a top plan view cut-away of the deck compartment 38, it will be seen that a first supply pipe 76, which is in communication with the first tank compartment 54, and a second supply pipe 78, which is in communication with the second tank compartment 56, are both communicated with each of the pumps 34, so that the station 10 is able to dispense multi-grade fuels. In a manner that is well-known and conventional, a first set of hoses 72 connect the first supply pipe 76 to each of the pumps 34, and a second set of hoses 74 connect the second supply pipe 78 to each of the pumps 34.

Figure 5:
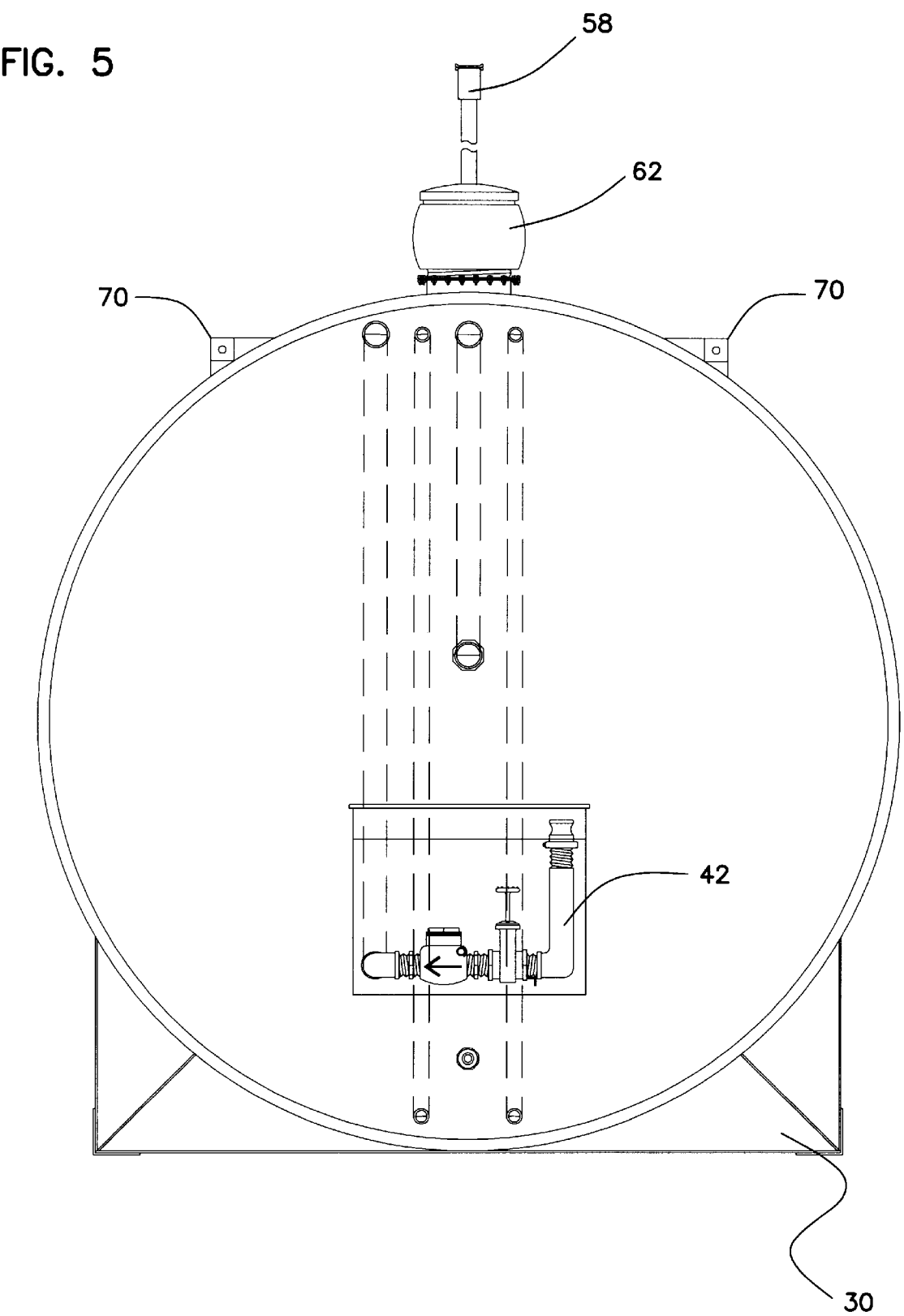
FIG. 5 is a end elevational view of the system shown in FIGS. 1–4.

Looking again to FIGS. 1 and 2, one advantageous aspect of the invention is the provision of an enclosure 94 about the above ground tank 12. The enclosure 94 screens, or, in the preferred embodiment, obstructs view of the above ground tank 12, giving the station 10 the aesthetic effect of a more permanent service station, and perhaps creating the illusion that the service station 10 is of the below ground type. Looking to FIG. 2, it will be seen that enclosure 94 includes a number of side panels 96, which have lower edges that are received in a keyway 104 that is defined in the first and second pads 16, 18 of the concrete pad assembly 14. Side panels 96 further have fittings 102 by which they can be secured at their upper ends to the tank 12, by means of a panel bracket 71, which attaches to the panel attachment fittings 870, as shown in FIG. 5. Enclosure 94 further includes a first end panel 98 and a second end panel 100, which are connected to the two ends of the above ground fuel storage tank 12 inboard of the pumps 34, and are secured to the tank 12 by means of panel brackets 71, which attach to panel attachment fittings 70 that are shown in FIG. 5. The roof 90 is fabricated from a plurality of roof panels 92, which are preferably constructed out of a lightweight, petroleum resistant material such as fiberglass. Roof panels 92 rest on top of the roof support stand-off member 66, and are secured at their lower ends to the roof edge support 68. The side panels 92, end panels 98, 100 and roof panels 92 thus create a freestanding structure about the storage tank 12 that effectively obscures storage tank 12 from view.

In order to provide power for the control system and for the pumps 34, a photovoltaic array 106 may be placed on top of the service station 10 and preferably on top of the canopies 80. Canopies 80 are supported by the canopy posts 82, as may be seen in FIG. 2. In addition, a video camera 108 and public address system or intercom system 109 may be placed on the service station 10 so that activity about the service station 10 may be monitored from afar and assistance provided. Spot lights 128 are also mounted to the canopies 80.

Referring now to FIG. 7, in a second embodiment of the invention, the enclosure 94 includes an attendant module 110 for providing shelter to an attendant and the control equipment 114 for the station 10. Attendant module 110 includes a lockable door 112 as may be seen in FIG. 7. According to one important aspect of an invention, attendant module 110 is fabricated from a fire wall material 122, which is constructed and arranged to withstand a petroleum-related fire emergency for a substantial length of time, such as two hours, in order to provide sufficient protection for the operator and any other occupants of the attendant module 110. In the preferred embodiment, fire wall 122 is embodied as a material having an outer metallic skin, such as aluminum, and an interior that includes multiple layers of fire resistant material, such as sheet rock.

As may further be seen in FIG. 7, the system includes a submergeable pump 120 and a submergeable pump spill container 118 that is mounted to the top of the tank and has a hinged cover so as to permit easy access to the pump 120 for maintenance purposes.

The control system for the pumps is substantially the same as that described in U.S. Pat. Nos. 4,988,020; 5,033,637; 5,305,926; and 5,562,162, the disclosures of which are hereby incorporated as if set forth fully herein.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A portable aboveground fluid containment assembly, comprising:
    an elongated aboveground tank, said tank having a longitudinal axis;
    at least two slab-like weight distributing pads for supporting said tank with respect to an underlying surface, each of said pads extending lengthwise in a direction that is substantially parallel to said longitudinal axis; and wherein
    said aboveground tank comprises at least one support member for supporting the tank on said pads, said support member being constructed and positioned so as to overlie both of said pads, thereby stabilizing said pads with respect to each other and stabilizing said entire portable aboveground fluid containment assembly.

2. An assembly according to claim 1, wherein said pads comprise lift assist means for permitting said pads to be conveniently lifted and deployed into location.

3. An assembly according to claim 2, wherein said lift assist means comprises a plurality of lifting lugs.

4. An assembly according to claim 1, wherein said tank is substantially cylindrical, and said support member comprises a saddle member that overlies said pads and intersects a seam that is defined between said pads.

5. An assembly according to claim 1, wherein said pads are fabricated from a material that is resistant to heat and that is chemically resistant to degradation as a result of exposure to petroleum products.

6. An assembly according to claim 5, wherein said pads are fabricated from a material comprising concrete.

7. An assembly according to claim 1, wherein at least one of said pads has a ballard secured thereto for protecting said tank against a collision.

8. An assembly according to claim 1, wherein at least one of said pads comprises securing means for securing a portion of a free standing building about said tank.

9. An assembly according to claim 1, wherein said pads are positioned so as to slope away from the tank, whereby liquid that may fall thereon is carried away from the tank.

10. A method of installing an aboveground fluid containment assembly, comprising steps of:
    (a) positioning at least two slab-like, weight distributing pads onto the ground, said pads being juxtaposed with respect to each other so as to define a longitudinal seam therebetween; and
    (b) deploying a portable aboveground fluid containment tank onto said pads so as to overlay both of said pads, whereby the pads are stabilized with respect to each other and to the entire portable aboveground fluid containment assembly.

11. A method according to claim 10, wherein step (a) is performed so as to position said pads to slope away from the tank, whereby liquid that may fall thereon is carried away from the tank.

12. A modular, portable, environmentally friendly aboveground fueling assembly, comprising:
    at least one slab-like, weight distributing pad member that is supported on the ground with no inground footings, said pad member being fabricated from a material that is heat resistant and that is resistant to exposure to petroleum products;
    a portable aboveground fuel tank supported on said pad member;
    pump means for dispensing fuel from said tank to a customer; and
    a freestanding structure secured to said fuel tank and said pad, said structure fully obscuring a customer's view of the fuel tank and thereby giving an aesthetic effect of a more substantial, permanent facility than would be given by said aboveground fuel tank standing alone.

13. An assembly according to claim 12, wherein said pad member comprises more than one portion, and at least one of said portions comprises comprise lift assist means for permitting said pads to be conveniently lifted and deployed into location.

14. An assembly according to claim 12, wherein said pad member is fabricated from a material comprising concrete.

15. An assembly according to claim 12, wherein said freestanding structure comprises a canopy for providing shelter for consumers during a fueling transaction.

16. An assembly according to claim 11, wherein said freestanding structure includes a roof that is constructed and arranged to allow venting of said fuel tank, and to permit access to said tank for maintenance purposes.

17. An assembly according to claim 12, wherein said freestanding structure is constructed and arranged to screen a customer's view of said tank.

18. An assembly according to claim 17, wherein said freestanding structure is constructed and arranged to obscure a customer's view of said tank.

19. An assembly according to claim 12, wherein said freestanding structure includes a module for housing an attendant.

20. An assembly according to claim 12, wherein said pad comprises at least one ballard for protecting said tank against collision.

21. An assembly according to claim 11, wherein said pad comprises securing means for securing a portion of a free standing building about said tank.

22. An assembly according to claim 21, wherein said securing means comprises a recess defined in said pad for receiving a structural portion of said freestanding structure.

23. An assembly according to claim 12, wherein said tank has at least one fitting thereon for securing said freestanding structure with respect to said tank.

24. An assembly according to claim 12, wherein said freestanding structure comprises a plurality of panel members.

25. A modular, portable, environmentally friendly aboveground fueling assembly, comprising:
- at least one slab-like, weight distributing pad member that is supported on the ground with no inground footings, said pad member being fabricated from a material that is heat resistant and that is resistant to exposure to petroleum products;
- a portable aboveground fuel tank supported on a first part of said pad member;
- pump means for dispensing fuel from said tank to a customer; and
- an attendant module supported on a second part of said pad member.

26. An assembly according to claim 25, wherein said attendant module is constructed and arranged from a fire-resistant material, whereby the operator and other occupants of said module are protected in the event of a fire-related emergency.

* * * * *